United States Patent [19]

Slicker

[11] Patent Number: 5,275,267
[45] Date of Patent: Jan. 4, 1994

[54] CLOSED LOOP LAUNCH AND CREEP CONTROL FOR AUTOMATIC CLUTCH WITH ROBUST ALGORITHM

[75] Inventor: James M. Slicker, Union Lake, Mich.

[73] Assignee: Eaton Corporation, Cleveland, Ohio

[21] Appl. No.: 772,778

[22] Filed: Oct. 7, 1991

[51] Int. Cl.$^5$ .................. B60K 41/28; F16D 43/00
[52] U.S. Cl. .................. 192/0.033; 192/0.052; 192/0.076; 192/103 R
[58] Field of Search .................. 192/0.076, 0.033, 103

[56] References Cited

U.S. PATENT DOCUMENTS

| | | | |
|---|---|---|---|
| 3,297,926 | 1/1967 | Campbell et al. | 318/138 |
| 4,081,065 | 3/1978 | Smyth et al. | 192/0.076 |
| 4,457,411 | 7/1984 | Hiramatsu | 192/0.076 |
| 4,676,609 | 6/1987 | Sturges et al. | 192/0.033 |
| 4,706,790 | 11/1987 | Lockhart et al. | 192/0.076 X |
| 4,724,939 | 2/1988 | Lockhart et al. | 192/3.3 |
| 4,766,544 | 8/1988 | Kurihara et al. | 192/0.052 X |
| 4,766,967 | 8/1988 | Slicker et al. | |
| 4,768,635 | 9/1988 | Sakurai et al. | 192/0.076 |
| 4,792,902 | 12/1988 | Hrovat et al. | 192/0.052 X |
| 4,793,454 | 12/1988 | Petzold et al. | 192/0.052 X |
| 4,823,925 | 4/1989 | Ohkumo et al. | 192/0.076 |
| 5,060,768 | 10/1991 | Yamashita et al. | 192/0.052 |
| 5,082,096 | 1/1992 | Yamashita et al. | 192/0.076 X |

FOREIGN PATENT DOCUMENTS

| | | |
|---|---|---|
| 2153954 | 8/1985 | United Kingdom . |
| 2231116 | 7/1990 | United Kingdom . |

OTHER PUBLICATIONS

"Computer Controlled Systems; Theory and Design", K. J. Astrom, B. Wittenmark, 1984, pp. 216–218.

*Primary Examiner*—Rodney H. Bonck
*Attorney, Agent, or Firm*—Krass & Young

[57] ABSTRACT

An automatic clutch controller for a vehicle that reduces the oscillatory response to clutch engagement. The automatic clutch controller receives inputs from an engine speed sensor and a transmission input speed sensor and develops a clutch actuation signal controlling a clutch actuator between from disengaged to fully engaged. The clutch engagement signal at least partially engages the friction clutch in a manner to cause the measured transmission input speed to asymptotically approach a reference speed employing an approximate inverse model of this oscillatory response. In a launch mode, corresponding to normal start of the vehicle, the reference speed is the measured engine speed. In a creep mode, corresponding to slow speed creeping of the vehicle, the reference speed is a creep speed reference based on the throttle setting and the engine speed. The two modes are selected based upon the throttle setting. The automatic clutch controller preferably includes an integral error function and a differential engine speed function, which together adaptively adjust clutch engagement corresponding to vehicle loading. The automatic clutch controller includes a prefilter and a compensator constructed to reduce the need for detailed particularization for individual vehicles or vehicle models.

43 Claims, 3 Drawing Sheets

CLOSED LOOP LAUNCH AND CREEP CONTROL FOR AUTOMATIC CLUTCH WITH ROBUST ALGORITHM

TECHNICAL FIELD OF THE INVENTION

The technical field of this invention is that of automatic clutch controls, and more particularly closed loop automatic clutch controls for reducing oscillatory response to launch and creep of a motor vehicle.

BACKGROUND OF THE INVENTION

In recent years there has been a growing interest in increased automation in the control of the drive train of motor vehicles, and most especially in control of the drive train of large trucks. The use of automatic transmissions in passenger automobiles and light trucks is well known. The typical automatic transmission in such a vehicle employs a fluid torque converter and hydraulically actuated gears for selecting the final drive ratio between the engine shaft and the drive wheels. This gear selection is based upon engine speed, vehicle speed and the like. It is well known that such automatic transmissions reduce the effectiveness of the transmission of power from the engine to the drive shaft, with the consummate reduction in fuel economy and power as compared with the skilled operation of a manual transmission. Such hydraulic automatic transmissions have not achieved wide spread use in large motor trucks because of the reduction in efficiency of the operation of the vehicle.

One of the reasons for the loss of efficiency when employing a hydraulic automatic transmission is loss occurring in the fluid torque converter. A typical fluid torque converter exhibits slippage and consequent loss of torque and power in all modes. It is known in the art to provide lockup torque converters that provide a direct link between the input shaft and the output shaft of the transmission above certain engine speeds. This technique provides adequate torque transfer efficiency when engaged, however, this technique provides no gain in efficiency at lower speeds.

It has been proposed to eliminate the inefficiencies inherent in a hydraulic torque converter by substitution of an automatically actuated friction clutch. This substitution introduces another problem not exhibited in the use of the hydraulic torque converters. The mechanical drive train of a motor vehicle typically exhibits considerable torsional compliance in the driveline between the transmission and the traction wheels of the vehicle. This torsional compliance may be found in the dive shaft between the transmission and the differential or the axle shaft between the differential and the driven wheels. It is often the case that independent design criteria encourages or requires this driveline to exhibit considerable torsional compliance. The existence of substantial torsional compliance in the driveline of the motor vehicle causes oscillatory response to clutch engagement. These oscillatory responses can cause considerable additional wear to the drive train components and other parts of the vehicle. In addition, these oscillatory responses can cause objectionable passenger compartment vibrations.

The oscillatory response of the driveline to clutch engagement is dependent in large degree to the manner in which the input speed of the transmission, i.e. the speed of the clutch, approaches the engine speed. A smooth approach of these speeds, such as via a decaying exponential function, imparts no torque transients on clutch lockup. If these speeds approach abruptly, then a torque transient is transmitted to the driveline resulting in an oscillatory response in the vehicle driveline.

Thus it would be an advantage to provide automatic clutch actuation of a friction clutch that reduces the oscillatory response to clutch engagement. The problem of providing such automatic clutch actuation is considerably increased in large trucks In particular, large trucks exhibit a wide range of variability in response between trucks and within the same truck. The total weight of a particular large truck may vary over an 8 to 1 range from unloaded to fully loaded. The driveline compliance may vary over a range of about 2 to 1 among different trucks. Further, the clutch friction characteristic may vary within a single clutch as a function of degree of clutch engagement and between clutches. It would be particularly advantageous to provide such an automatic clutch actuation system that does not require extensive adjustment to a particular motor vehicle or the operating condition of the motor vehicle.

SUMMARY OF THE INVENTION

This invention is an automatic clutch controller used in a combination including a source of motive power, a friction clutch, and at least one inertially-loaded traction wheel connected to the friction clutch that has a torsional compliance exhibiting an oscillatory response to torque inputs. The automatic clutch controller is preferably used with a transmission shift controller. This automatic clutch controller provides smooth clutch engagement during vehicle launch, following transmission shifts and during creep to minimize the oscillatory response to clutch engagement. This automatic clutch controller is useful in large trucks.

The automatic clutch controller receives inputs from an engine speed sensor and a transmission input speed sensor. The transmission input speed sensor senses the rotational speed at the input to the transmission, which is the output of the friction clutch. The automatic clutch controller develops a clutch engagement signal controlling a clutch actuator between fully disengaged and fully engaged. The clutch engagement signal engages the friction clutch in a manner causing asymptotic approach of the transmission input speed to a reference speed. This minimizes the oscillatory response to torque inputs of the inertially-loaded traction wheel.

In the preferred embodiment the automatic clutch controller operates in two modes. In a launch mode, corresponding to normal start of the vehicle, the clutch engagement signal causes the transmission input speed to asymptotically approach the engine speed. This same mode may optionally also be used for clutch re-engagement upon transmission gear shifts. In a creep mode, corresponding to slow speed creeping of the vehicle, the clutch engagement signal causes the transmission input speed to asymptotically approach a creep reference signal. This creep reference signal is generated based on the amount of throttle and the engine speed. The two modes are selected based upon the throttle setting. The launch mode is selected for a throttle of more than 25% full throttle, otherwise the creep mode is selected.

The automatic clutch controller includes construction to reduce the need for detailed particularization for individual vehicles or vehicle models. A transmission input speed reference signal is supplied to a prefilter. This transmission input speed reference signal corresponds to the engine speed when the launch mode is selected and the creep reference signal when the creep mode is selected. The prefilter serves to shape the system transient response. An algebraic summer forms the controlled error by subtracting the transmission input speed signal from the prefiltered transmission input speed reference signal. This error signal is supplied to a compensator having sufficient gain as a function of frequency to reduce the system closed loop sensitivity to vehicle parameter variations. The compensator produces a clutch engagement signal for controlling clutch engagement in a manner to minimize the oscillatory response to clutch engagement.

The automatic clutch controller is preferably implemented in discrete difference equations executed by a digital microcontroller. The microcontroller implements a compensator having a transfer function approximately the inverse of the transfer function of the inertially-loaded traction wheel. This compensator transfer function includes a notch filter covering the region of expected oscillatory response of the driveline. The frequency band of this notch filter must be sufficiently broad to cover a range of frequencies because the oscillatory response frequency may change with changes in vehicle loading and driveline characteristics. The compensator also preferably provides an elevated response in range of frequencies where the driveline response is a minimum to increase the loop gain and reduce sensitivity to variations in vehicle characteristics.

The clutch actuation controller preferably stores sets of coefficients for the discrete difference equations corresponding to each gear ratio of the transmission. The clutch actuation controller recalls the set of coefficients corresponding to the selected gear ratio. These recalled set of coefficients are employed in otherwise identical discrete difference equations for clutch control.

The controller preferably includes an integral error function for insuring full clutch engagement within a predetermined interval of time after initial partial engagement when in the launch mode. Any long term difference between the transmission input speed reference signal and the transmission input speed eventually drives the clutch to full engagement. The controller preferably also includes a second integral function to ensure clutch lockup even if the engine speed in increasing.

The integral function and the second integral function are preferably disabled when the rate of engine speed increase falls below a predetermined threshold. This level could be zero, disabling the first and second integral functions when the engine speed decreases. A threshold detector determines when to disable the integrators based on the differential signal. Respective switches connected to the threshold detector enables and disables integration. This permits delay of the advance of the clutch when the rate of engine speed increase falls below the threshold. This will generally occur only when accelerating under heavy load. In this case the clutch will continue to slip allowing the load to slowly accelerate until the torque demand is reduced to the available engine torque. Then the integrators will again be enabled and clutch advance will resume.

The automatic clutch controller may further include a differentiator connected to the engine speed sensor. The engine speed differential signal corresponding to the rate of change of the engine speed signal is added to the signal supplied to the clutch actuator. This differential signal causes rapid advance of clutch actuation when the engine speed is accelerating. Rapid advance of the clutch in this case prevents the engine speed from running away. An integrator connected to the differentiator saves the clutch actuation level needed to restrain the engine speed once the engine speed is no longer accelerating.

BRIEF DESCRIPTION OF THE DRAWINGS

These and other objects and aspects of the present invention will be described below in conjunction with the drawings in which.

DETAILED DESCRIPTION OF THE PREFERRED EMBODIMENTS

Figure 1:
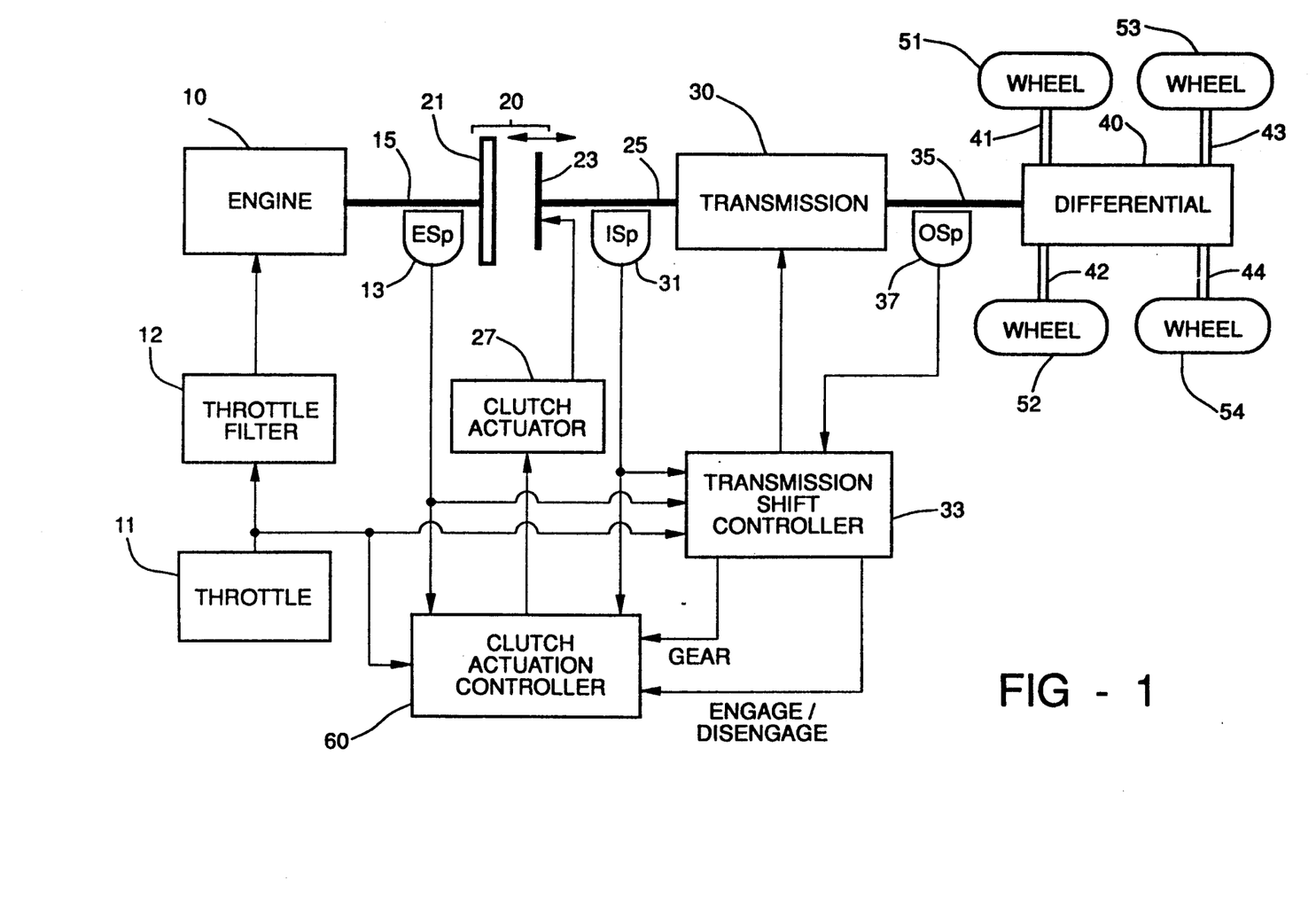
FIG. 1 illustrates a schematic view of the vehicle drive train including the clutch actuation controller of the present invention.

FIG. 1 illustrates in schematic form the drive train of a motor vehicle including the automatic clutch controller of the present invention. The motor vehicle includes engine 10 as a source of motive power. For a large truck of the type to which the present invention is most applicable, engine 10 would be a diesel internal combustion engine. Throttle 11, which is typically a foot operated pedal, controls operation of engine 10 via throttle filter 12. Throttle filter 12 filters the throttle signal supplied to engine 10 by supplying a ramped throttle signal upon receipt of a step throttle increase via throttle 11. Engine 10 produces torque on engine shaft 15. Engine speed sensor 13 detects the rotational velocity of engine shaft 15. The actual site of rotational velocity detection by engine speed sensor may be at the engine flywheel. Engine speed sensor 13 is preferably a multitooth wheel whose tooth rotation is detected by a magnetic sensor.

Friction clutch 20 includes fixed plate 21 and movable plate 23 that are capable of full or partial engagement. Fixed plate 21 may be embodied by the engine flywheel. Friction clutch 20 couples torque from engine shaft 15 to input shaft 25 corresponding to the degree of engagement between fixed plate 21 and movable plate 23. Note that while FIG. 1 illustrates only a single pair of fixed and movable plates, those skilled in the art would realize that clutch 20 could include multiple pairs of such plates.

Figure 2:
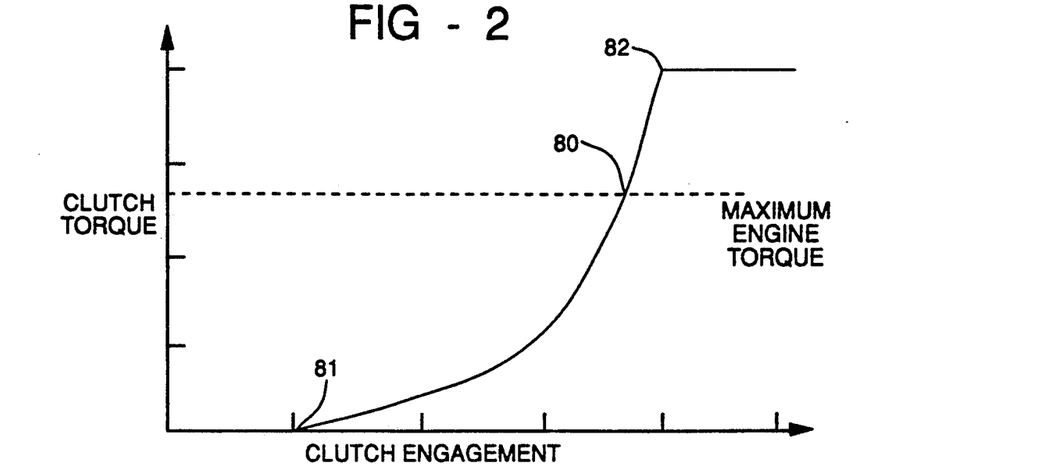
FIG. 2 illustrates the typical relationship between clutch engagement and clutch torque.

A typical torque verses clutch position function is illustrated in FIG. 2. Clutch torque/position curve 80 is initially zero for a range of engagements before initial touch point 81. Clutch torque rises monotonically with increasing clutch engagement. In the example illustrated in FIG. 2, clutch torque rises slowly at first and then more steeply until the maximum clutch torque is reached upon full engagement at point 82. The typical clutch design calls for the maximum clutch torque upon full engagement to be about 1.5 times the maximum engine torque. This ensures that clutch 20 can transfer the maximum torque produced by engine 10 without slipping.

Clutch actuator 27 is coupled to movable plate 23 for control of clutch 20 from disengagement through partial engagement to full engagement. Clutch actuator 27 may be an electrical, hydraulic or pneumatic actuator and may be position or pressure controlled. Clutch actuator 27 controls the degree of clutch engagement according to a clutch engagement signal from clutch actuation controller 60.

Transmission input speed sensor 31 senses the rotational velocity of input shaft 25, which is the input to transmission 30. Transmission 30 provides selectable drive ratios to drive shaft 35 under the control of transmission shift controller 33. Drive shaft 35 is coupled to differential 40. Transmission output speed sensor 37 senses the rotational velocity of drive shaft 35. Transmission input speed sensor 31 and transmission output speed sensor 37 are preferably constructed in the same manner as engine speed sensor 13. In the preferred embodiment of the present invention, in which the motor vehicle is a large truck, differential 40 drives four axle shafts 41 to 44 that are in turn coupled to respective wheels 51 to 54.

Transmission shift controller 33 receives input signals from throttle 11, engine speed sensor 13, transmission input speed sensor 31 and transmission output speed sensor 37. Transmission shift controller 33 generates gear select signals for control of transmission 30 and clutch engage/disengage signals coupled to clutch actuation controller 60. Transmission shift controller 33 preferably changes the final gear ratio provided by transmission 30 corresponding to the throttle setting, engine speed, transmission input speed and transmission output speed. Transmission shift controller 33 provides respective engage and disengage signals to clutch actuation controller 60 depending on whether friction clutch 20 should be engaged or disengaged. Transmission shift controller also transmits a gear signal to clutch actuation controller 60. This gear signal permits recall of the set of coefficients corresponding to the selected gear. Note transmission shift controller 33 forms no part of the present invention and will not be further described.

Clutch actuation controller 60 provides a clutch engagement signal to clutch actuator 27 for controlling the position of movable plate 23. This controls the amount of torque transferred by clutch 20 according to clutch torque/position curve 80 of FIG. 2. Clutch actuation controller 60 operates under the control of transmission shift controller 33. Clutch actuation controller 60 controls the movement of moving plate 23 from disengagement to at least partial engagement or full engagement upon receipt of the engage signal from transmission shift controller 33. In the preferred embodiment it is contemplated that the clutch engagement signal will indicate a desired clutch position. Clutch actuator 27 preferably includes a closed loop control system controlling movable plate 23 to this desired position. It is also feasible for the clutch engagement signal to represent a desired clutch pressure with clutch actuator 27 providing closed loop control to this desired pressure. Depending on the particular vehicle, it may be feasible for clutch actuator 27 to operate in an open loop fashion. The exact details of clutch actuator 27 are not crucial to this invention and will not be further discussed.

Clutch actuation controller 60 preferably generates a predetermined open loop clutch disengagement signal for a ramped out disengagement of clutch 20 upon receipt of the disengage signal from transmission shift controller 33. No adverse oscillatory responses are anticipated for this predetermined open loop disengagement of clutch 20.

Figure 3:
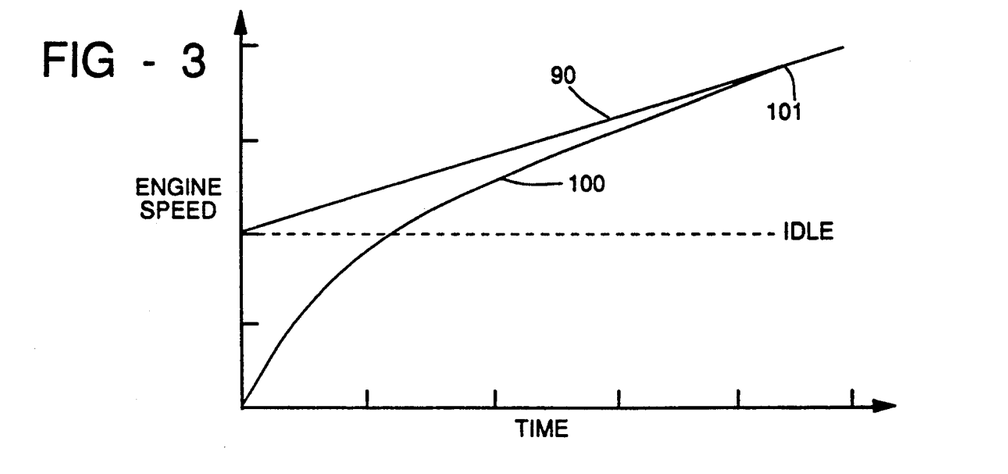
FIG. 3 illustrates the ideal response of engine speed and transmission input speed over time for launch of the motor vehicle.
Figure 4:
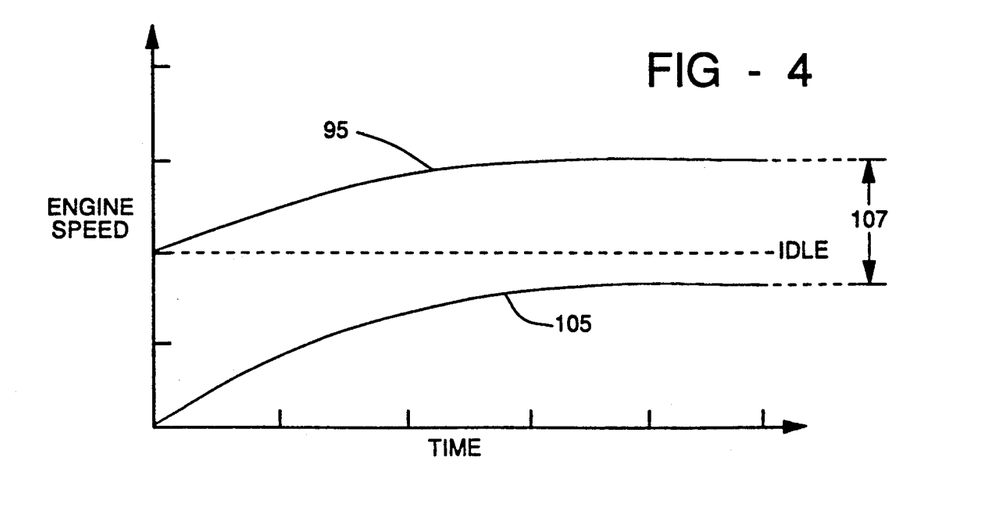
FIG. 4 illustrates the ideal response of engine speed and transmission input speed over time for creeping of the motor vehicle.

FIGS. 3 and 4 illustrate the two cases of starting the vehicle from a full stop. FIGS. 3 and 4 illustrate the engine speed and the transmission input speed during ideal clutch engagement. FIG. 3 illustrates the case of launch. FIG. 4 illustrates the case of creep.

FIG. 3 illustrates the case of launch, that is starting out from a stop in order to proceed at a reasonable speed. Initially, the engine speed 90 is at idle. Thereafter engine speed 90 monotonically increases within the time frame of FIG. 3. Engine speed 90 either increases or remains the same. Ideally engine speed 90 increases until the torque produced by engine 10 matches the torque required to accelerate the vehicle. At high load this engine speed may be in the mid range between the idle speed and the maximum engine speed. This constant engine speed corresponds to the engine torque required to match clutch torque and driveline torque and achieve a balance between engine output torque and the vehicle load torque. This torque level is the ideal clutch torque because a higher clutch torque would stall engine 10 and a lower clutch torque would allow the engine speed to increase too much. Ultimately the vehicle would accelerate to a speed where clutch 20 can be fully engaged. Thereafter the balance between engine torque and load torque is under the control of the driver via the throttle setting and clutch actuation controller 60 would continue to command full clutch engagement.

When the vehicle is stopped and clutch 20 fully disengaged, transmission input speed 100 is initially zero. This is the case for starting the vehicle. However, as further explained below, this same technique can be used for smooth clutch engagement upon shifting gears while moving. Thus the transmission input speed may initially be a value corresponding to the vehicle speed. Upon partial engagement of clutch 20, transmission input speed 100 increases and approaches engine speed 90 asymptotically. At a point 101, transmission input speed 100 is sufficiently close to engine speed 90 to achieve full engagement of clutch 20 without exciting the torsional compliance of the driveline of the vehicle. At this point clutch 20 is fully engaged. Thereafter transmission input speed 100 tracks engine speed 90 until clutch 20 is disengaged when the next higher final gear ratio is selected by transmission controller 33. The system preferably also operates for the case in which the vehicle is not stopped and the initial transmission input speed is nonzero.

FIG. 4 illustrates the engine speed and transmission input speed for the case of creep. In the creep mode, clutch 20 must be deliberately slipped in order to match the available engine torque at an engine speed above idle and the required torque. FIG. 4 illustrates engine speed 95 rising from idle to a plateau level. In a similar fashion input speed 105 rises from zero to a predetermined level. This predetermined level is less than the engine idle speed in this example. The creep mode is required when the desired vehicle speed implies a transmission input speed less than idle for the lowest gear ratio. The creep mode may also be required when the desired vehicle speed implies a transmission input speed above engine idle and engine 10 cannot produce the required torque at this engine speed. Note that there is a speed difference 107 between the engine speed 95 and the input speed 105 under quiescent conditions. This difference 107 represents the slip speed required for this creep operation.

Figure 5:
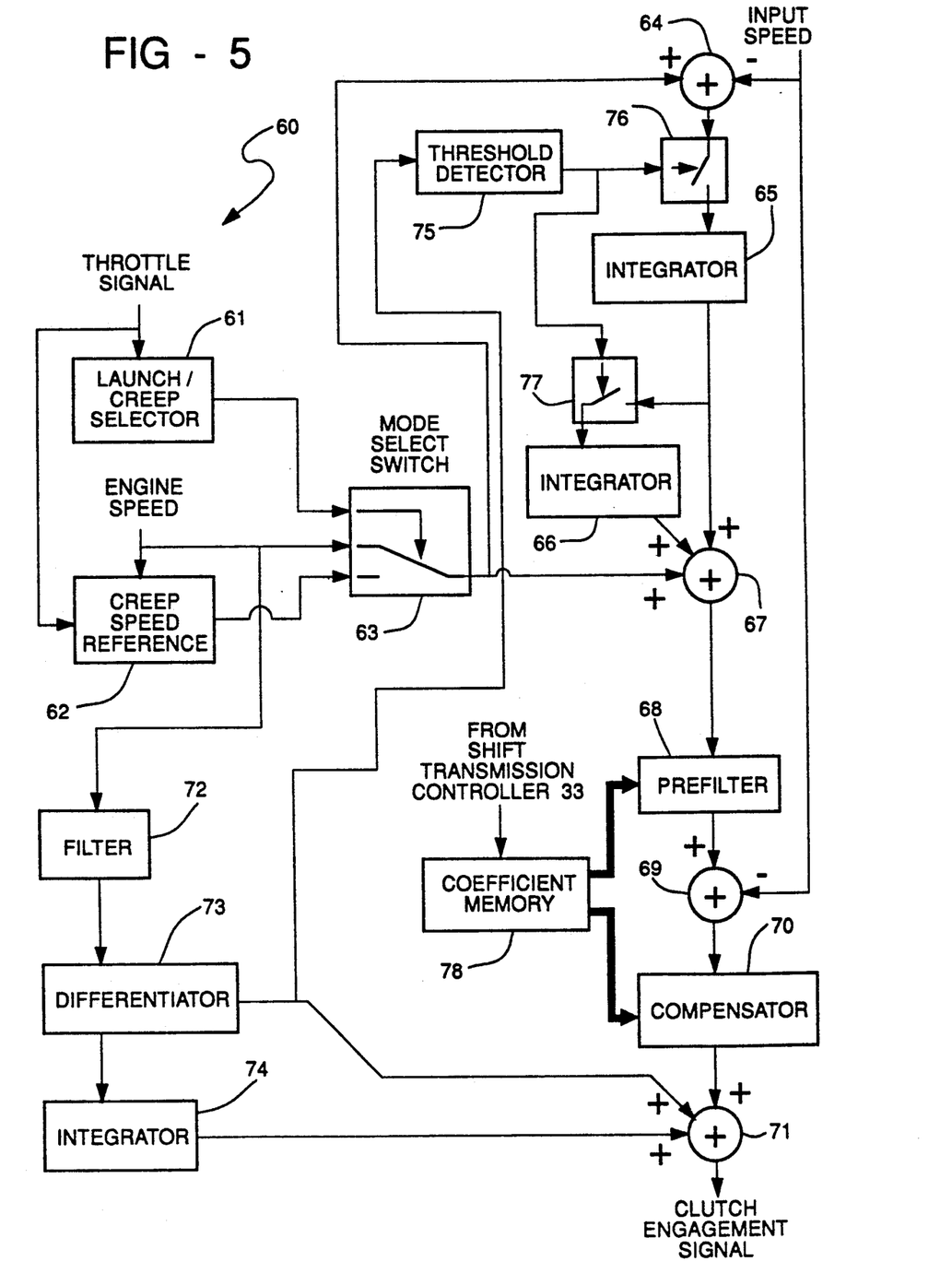
FIG. 5 illustrates a preferred embodiment of the clutch actuation controller of the present invention.

FIG. 5 illustrates schematically the control function of clutch actuation controller 60. As also illustrated in FIG. 1, clutch actuation controller 60 receives the throttle signal from throttle 11, the engine speed signal from engine speed sensor 13 and the transmission input speed signal from transmission input speed sensor 31. Clutch actuation controller 60 illustrated in FIG. 5 generates a clutch engagement signal that is supplied to clutch actuator 27 for operation of the friction clutch 20. Although not shown in FIG. 5, the degree of clutch actuation, together with the throttle setting, the engine speed and the vehicle characteristics determine the transmission input speed that is sensed by transmission input speed sensor 31 and supplied to clutch actuation controller 60. Therefore, the control schematic illustrated in FIG. 5 is a closed loop system.

The control function illustrated in FIG. 5 is needed only for clutch positions between touch point 81 and full engagement. Clutch engagement less than that corresponding to touch point 81 provide no possibility of torque transfer because clutch 20 is fully disengaged. Clutch actuation controller 60 preferably includes some manner of detection of the clutch position corresponding to touch point 81. Techniques for this determination are known in the art. As an example only, the clutch position at touch point 81 can be determined by placing transmission 30 in neutral and advancing clutch 20 toward engagement until transmission input speed sensor 31 first detects rotation. Upon receipt of the engage signal from transmission shift controller 33, clutch actuation controller 60 preferably rapidly advances clutch 20 to a point corresponding to touch point 81. This sets the zero of the clutch engagement control at touch point 81. Thereafter the clutch engagement is controlled by the control function illustrated in FIG. 5.

Clutch actuation controller 60 is preferably realized via a microcontroller circuit. Inputs corresponding to the engine speed, the transmission input speed and the throttle setting must be in digital form. These input signals are preferably sampled at a rate consistent with the rate of operation of the microcontroller and fast enough to provide the desired control. As previously described, the engine speed, transmission input speed and transmission output speed are preferably detected via multitooth wheels whose teeth rotation is detected by magnetic sensors. The pulse trains detected by the magnetic sensors are counted during predetermined intervals. The respective counts are directly proportional to the measured speed. For proper control the sign of the transmission input speed signal must be negative if the vehicle is moving backwards. Some manner of detecting the direction of rotation of input shaft 25 is needed. Such direction sensing is conventional and will not be further described. The throttle setting is preferably detected via an analog sensor such as a potentiometer. This analog throttle signal is digitized via an analog-to-digital converter for use by the microcontroller. The microcontroller executes the processes illustrated in FIGS. 5 by discrete difference equations in a manner known in the art. The control processes illustrated in FIG. 5 should therefore be regarded as an indication of how to program the microcontroller embodying the invention rather than discrete hardware. It is feasible for the same microcontroller, if of sufficient capacity and properly programmed, to act as both clutch actuation controller 60 and as transmission shift controller 33. It is believed that an Intel 80C196 microcontroller has sufficient computation capacity to serve in this manner.

The throttle signal received from throttle 11 is supplied to launch/creep selector 61 and to creep speed reference 62. Launch/creep selector 61 determines from the throttle signal whether to operate in the launch mode or to operate in the creep mode. In the preferred embodiment of the present invention, launch/creep selector 61 selects the launch mode if the throttle signal indicates greater than 25% of the full throttle setting. In other cases launch/creep selector 61 selects the creep mode.

Creep speed reference 62 receives the throttle signal and the engine speed signal and generates a creep speed reference signal. This creep speed reference signal is determined as follows:

$$R_{crp} = E_{sp} \frac{T}{T_{ref}} \tag{1}$$

where: $R_{crp}$ is the creep speed reference signal; $E_{sp}$ is the measured engine speed; $T$ is the throttle signal; and $T_{ref}$ is a throttle reference constant equal to the throttle signal for 25% full throttle. The creep speed reference signal is the product of the engine speed signal and the ratio of the actual throttle to 25% full throttle. No creep speed reference signal is required for throttle settings above 25% of full throttle because the launch mode is applicable rather than the creep mode. Note that this creep speed reference signal makes the speed reference signal continuous even when switching between the launch mode and the creep mode. Thus no instabilities are induced if changes in the throttle setting causes switching between the two modes.

Mode select switch 63 determines the mode of operation of clutch actuation controller 60. Mode select switch 63 receives the mode selection determination made by launch/creep selector 61. Mode select switch 63 selects either the engine speed signal or the creep speed reference signal depending upon the mode determined by launch/creep selector 61. In the event that the launch mode is selected mode select switch 63 selects the engine speed for control. Thus in the launch mode the clutch engagement is controlled so that the transmission input speed matches the engine speed. In the event that the creep mode is selected mode select switch 63 selects the creep speed reference signal for control. In creep mode the clutch engagement is controlled to match transmission input speed to the creep speed reference signal. This is equivalent to controlling clutch engagement to match the actual clutch slip to desired slip speed. In either mode, the speed reference signal is a transmission input speed reference.

As noted above, mode select switch 63 selects a speed reference signal for control. Clutch actuation controller 60 includes an integral function. The transmission input speed from transmission input speed sensor 31 is subtracted from the speed reference signal selected by mode select switch 63 in algebraic summer 64. Ignoring for the moment threshold detector 75, and switches 76 and 77, integrator 65 integrates this difference signal, which is the error between the desired transmission input speed from mode select switch 63 and the measured transmission input speed. The integrated difference signal is supplied to algebraic summer 67 and to a second integrator 66. Integrator 66 integrates the integral of the error, thus forming a second integral of this error. Algebraic summer 67 sums the speed reference signal from mode select switch 63, the integrated error from integrator 65 and the second integral of the error from integrator 66.

Algebraic summer 67 supplies the input to prefilter 68. Prefilter 68 is employed to shape the closed loop transient response of automatic clutch controller 60. This shaping of the transient response has the goal of achieving asymptotic approach of the input speed to the reference speed. The character of prefilter 68 and its manner of determination will be further described below.

The prefiltered signal from prefilter 68 is supplied to algebraic summer 69. Algebraic summer 69 also receives the measured transmission input speed signal from transmission input speed sensor 31. Algebraic summer 69 forms the difference between the prefiltered signal from prefilter 68 and the transmission input speed. This difference is supplied to compensator 70. Compensator 70 includes an approximate inverse model of the torsional oscillatory response of the vehicle to torque inputs. Compensator 70 includes a gain versus frequency function selected to reduce variations in the closed loop response of clutch actuation controller 60 due to variations in the transfer function of the vehicle driveline. Determination of the transfer function of compensator 70 will be further described below.

A feedforward signal is provided in the clutch engagement signal via an engine speed differential signal. The engine speed signal is suitably filtered via low pass filter 72 to reduce noise in the differential signal. Differentiator 73 forms a differential signal proportional to the rate of change in the engine speed. This engine speed differential signal and its integral formed by integrator 74 are supplied to algebraic summer 71. Algebraic summer 71 sums the output of compensator 70, the engine speed differential signal from differentiator 73 and the integral signal from integrator 74 to form the clutch engagement signal. Clutch actuator 27 employs this clutch engagement signal to control the degree of clutch engagement.

The feedforward signal permits better response of clutch actuation controller 60 when the engine speed is accelerating. Under conditions of engine speed acceleration the feedforward signal causes rapid engagement of clutch 20 proportional to the rate of engine acceleration. The engine speed can increase rapidly under full throttle conditions before the driveline torque is established. This is because the speed of response of clutch actuation controller 60 without this feedforward response is low compared with the peak engine speed of response. With this feedforward response rapid engine acceleration results in more rapid than otherwise clutch engagement. The additional clutch engagement tends to restrain increase in engine speed by requiring additional torque from the engine. When the engine speed reaches a constant value, the differential term decays to zero and integrator 74 retains the clutch engagement needed to restrain engine speed. Other portions of the control function then serve to provide asymptotic convergence of the transmission input speed to the reference speed.

Provision of the integral and double integral signals in the input to prefilter 68 serves to ensure clutch lockup when operating in the launch mode. The second integral ensures clutch lockup even if the engine speed in increasing. The integration rates of integrators 65 and 66 can be adjusted by corresponding integration coefficients $k_{I1}$ and $k_{I2}$. The existence of any long term difference between the speed reference signal selected by mode select switch 63 and the transmission input speed generates an increasing integral signal. Any such integral signal serves to drive the clutch engagement signal toward full clutch engagement. This ensures that clutch 20 is fully engaged at point 101 at some predetermined maximum time following start up of the vehicle when in the launch mode. In the creep mode, integrators 65 and 66 ensure that there is no long term error between the creep speed reference signal and the transmission input speed.

The integral function and the second integral function are preferably disabled when the rate of engine speed increase falls below a predetermined threshold. This level could be zero, disabling the first and second integral functions when the engine speed decreases. Threshold detector 75 determines when to disable integrators 65 and 66 based on the differential signal. The rate of engine speed increase would typically fall below the threshold upon too rapid clutch engagement for the current engine speed and vehicle torque demand. Switches 76 and 77 are normally closed, enabling integrators 65 and 66. If the rate of change of engine speed formed by differentiator 73 is below the threshold of threshold detector 75, then threshold detector 75 trips. This opens switches 76 and 77, and disables further integration in integrators 65 and 66. The additional clutch advancement caused by integrators 65 and 66 ceases. In this case the clutch would hold for a time at a steady position. This permits a torque balance between the engine output torque and the vehicle load torque. This torque balance tends to keep engine 10 at a constant speed. This generally occurs under high vehicle load conditions when the vehicle takes longer to accelerate. The engine torque transmitted via clutch 20 to the vehicle load tends to accelerate the vehicle. Clutch lockup is delayed during the interval when integrators 65 and 66 are disabled. Clutch lockup may still occur under these conditions if the vehicle accelerates to a high enough speed so that the transmission input speed reaches the engine speed. When the vehicle load permits the rate of change of engine speed to again exceed the threshold, then integrators 65 and 66 are re-enabled. This permits integrators 65 and 66 to drive the clutch engagement signal to clutch lockup. Note that during the interval when integrators 65 and 66 are disabled and clutch lockup is delayed, the interval to clutch lockup can be shortened by increasing the throttle. This provides additional engine torque, permitting an engine speed increase and re-enabling the integrators.

This switching of integrators 65 and 66 provides adaptive clutch engagement. Clutch engagement is rapid under conditions of engine acceleration, which generally occurs only during light vehicle loads. Under conditions of high vehicle loads, full clutch engagement is delayed to prevent engine stalling. Thus this technique complements the feedforward technique that causes rapid clutch engagement when the engine is accelerating.

Prefilter 68 and compensator 70 perform differing and complementary functions in clutch actuation controller 60. The transfer functions of prefilter 68 and compensator 70 are determined as follows. The transfer function of compensator 70 is selected to reduce sensitivities of the closed loop transfer function to driveline parameter variations. This is achieved by providing sufficient loop gain as a function of frequency. If the sensitivity of the closed loop transfer function H(ω) with respect to the transfer function of the driveline G(ω) is $S_{G(\omega)}^{H(\omega)}$, then $$S_{G(\omega)}^{H(\omega)} = \frac{1}{(1 + C(\omega) G(\omega))} \quad (2)$$

where C(ω) is the transfer function of compensator 70. Inspection of this relationship reveals that the sensitivity $S_{G(\omega)}^{H(\omega)}$ can be reduced arbitrarily to zero by increasing the compensator gain. There are practical limits to the maximum compensator gain because of stability and noise problems. Thus the transfer function C(ω) of compensator 70 is selected high enough at all frequencies ω to limit the variations in the closed loop transfer function to an acceptable level set as a design criteria.

Compensator 70 includes an approximate inverse model of the torsional oscillatory response. In the typical heavy truck to which this invention is applicable, the torsional compliance of the driveline causes the driveline transfer function to have a pair of lightly damped poles that may range from 2 to 5 Hz. The exact value depends upon the vehicle parameter values. The inverse response of compensator 70 provides a notch filter in the region of these poles. The frequency band of the notch is sufficiently broad to cover the range of expected vehicle frequency responses. This frequency band is preferably achieved employing two pairs of zeros whose frequencies are spread over the frequency range of the vehicle response. Thus compensator 70 provides plural complex zeros in the frequency range of these poles of the vehicle response to attenuate the oscillatory response. The typical heavy truck also includes a pair of complex zeros in the frequency range from 1 to 2 Hz. These complex zeros tend to reduce the system loop gain and hence cause the system to be more sensitive to variations in vehicle characteristics in this frequency range. Compensator 70 preferably provides a pair of complex poles in this frequency range to increase the loop gain and reduce sensitivity to variations in vehicle characteristics. Thus the total response of the closed loop system has highly damped eigen values providing a less oscillatory system.

Prefilter 68 is employed to reliably achieve a desired closed loop transient response. The transfer function H(ω) of the closed loop system without prefilter 68 is:

$$H(\omega) = \frac{C(\omega) G(\omega)}{(1 + C(\omega) G(\omega))} \quad (3)$$

where C(ω) is the transfer function of compensator 70 and G(ω) is the transfer function of the driveline. The above noted design for compensator 70 takes into account only reduction in sensitivity to variations in the driveline response G(ω). This typically results in a closed loop response H(ω) having an inappropriate time response. The design goal it to actuate clutch 20 to achieve asymptotic convergence of the transmission input speed to engine speed. The transfer function H(ω) with prefilter 68 is:

$$H(\omega) = \frac{F(\omega) C(\omega) G(\omega)}{(1 + C(\omega) G(\omega))} \quad (4)$$

where F(ω) is the transfer function of prefilter 68. Prefilter 68 is a low pass filter with the pass band related to the design rate of asymptotic convergence.

The above outlined determination of the response character of prefilter 68 and compensator 70 corresponds to the quantitative feedback theory of Horowitz. This theory is exemplified in "Quantative Feedback Theory" by I. M. Horowitz, IEE Proceedings, Vol. 129, PT.d, no. 6, November 1982. This selection of the response of prefilter 68 and compensator 70 results in a system that is robust, that is, capable of properly responding to widely varying vehicle conditions.

As noted above, the elements of FIG. 5 are preferably implemented via discrete difference equations in a microcontroller. In the preferred embodiment the i-th value of the output $P_i$ of prefilter 68 is given by:

$$P_i = k_{P1}I_{i-1} + k_{P2}I_i + k_{P3}P_{i-1} + k_{P4}P_{i-2} \quad (5)$$

where; $I_i$ is the current value of the prefilter input; $I_{i-1}$ is the immediately preceding value of the prefilter input; $P_{i-1}$ is the immediately preceding value of the prefilter output; $P_{i-2}$ is the next preceding value of the prefilter output; and where the $k_{Pn}$ are coefficients with $k_{P1}=0.00015$, $k_{P2}=0.00015$, $k_{P3}=1.9677$, and $k_{P4}=-0.9860$.

The discrete difference equation of compensator 70 is preferably implemented in three stages. This enables the compensator coefficients to have sufficiently fewer significant figures for a 16 bit integer digital implementation of this process. The i-th value of the first intermediate variable $F1_i$ is given by:

$$F1_i = k_{C1}C_i + k_{C2}C_{i-1} + k_{C3}C_{i-2} + k_{C4}F1_{i-1} + k_{C5}F1_{i-2} \quad (6)$$

where: $C_i$ is the current value of the compensator input; $C_{i-1}$ is the immediately preceding value of the compensator input; $C_{i-2}$ is the next preceding value of the compensator input; $F1_{i-1}$ is the immediately preceding value of the first intermediate variable; $F1_{i-2}$ is the next preceding value of the first intermediate variable; and where the $k_{Cn}$ are coefficients with $k_{C1}=0.667$, $k_{C2}=-1.16$, $k_{C3}=0.5532$, $k_{C4}=1.482$, and $k_{C5}=-0.5435$. Note that the successive compensator input values $C_i$ are computed from successive differences between the prefilter output and the transmission input speed. The i-th value of the second intermediate variable $F2_i$ is given by:

$$F2_i = k_{C6}F1_i + k_{C7}F1_{i-1} + k_{C8}F1_{i-2} + k_{C9}F2_{i-1} + k_{C10}F2_{i-2} \quad (7)$$

where: $F1_i$ is the current value of the first intermediate variable; $F1_{i-1}$ is the immediately preceding value of the first intermediate variable; $F1_{i-2}$ is the next preceding value of the first intermediate variable; $F2_{i-1}$ is the immediately preceding value of the second intermediate variable; $F2_{i-2}$ is the next preceding value of the second intermediate variable; and where the $k_{Cn}$ are coefficients with $k_{C6}=0.2098$, $k_{C7}=-0.39$, $k_{C8}=0.189$, $k_{C9}=1.8432$, and $k_{C10}=-0.8518$. Lastly, the i-th value of the compensator output $O_i$ is:

$$O_i = k_{C11}F2_i + k_{C12}F2_{i-1} + k_{C13}O_{i-1} \quad (8)$$

where: $F2_i$ is the current value of the second intermediate variable; $F2_{i-1}$ is the immediately preceding value of the second intermediate variable; $O_{i-1}$ is the immediately preceding value of the compensator output; and where the $k_{Cn}$ are coefficients with $k_{C11}=0.25$, $k_{C12}=-0.245$, and $k_{C13}=0.995$.

The present invention can be advantageously employed for clutch re-engagement following shifts of the transmission. In this event the same control processes illustrated in FIG. 5 would be employed, including the above listed discrete difference equations for prefilter 68 and compensator 70. The control processes for transmission shifts would differ from the preceding description in selection of the coefficients $k_{P1}$ to $k_{P4}$ and $k_{C1}$ to $k_{C13}$. A particular set of these coefficients $k_n$ would be recalled from coefficient memory 75 depending upon the gear signal from transmission shift controller 33. The selected set of coefficients may also include coefficients of integration for integrators 65, 66 and 74, and coefficients for filter 69 and differentiator 70. In other respects the invention would operate the same as described above.

The control processes of the present invention are robust with regard to variations in vehicle response. It is believed that the automatic clutch controller herein described is capable of handling changes in vehicle loading within a single vehicle and variations in response between differing combinations of engine, clutch and driveline oscillatory response between different vehicles. Thus the automatic clutch controller of this invention need not be particularized for a particular vehicle. Thus the invention automatic clutch controller is easier to manufacture for a variety of vehicles.

I claim:

1. In a combination including a source of motive power, a friction clutch having an input shaft connected to the source of motive power and an output shaft, and at least one inertially-loaded traction wheel connected to the output shaft of the friction clutch having a torsional compliance exhibiting an oscillatory response to torque inputs, an automatic clutch controller comprising:
    an engine speed sensor connected to the source of motive power for generating an engine speed signal corresponding to the rotational speed of the source of motive power;
    a reference speed generator connected to said engine speed sensor for generating a reference speed signal;
    a transmission input speed sensor connected to the output shaft of the friction clutch for generating a transmission input speed signal corresponding to the rotational speed of the output shaft of the friction clutch;
    a clutch actuator connected to the friction clutch for controlling engagement of the friction clutch from disengaged to fully engaged according to a clutch engagement signal; and
    a controller connected to said reference speed generator, said transmission input speed sensor and said clutch actuator including
        a prefilter connected to said reference speed generator for generating a filtered reference speed signal,
        a first algebraic summer connected to said transmission input speed sensor and said prefilter generating a first algebraic sum signal corresponding to the difference between (1) said filtered reference speed signal and (2) said transmission input speed signal, and
        a compensator connected to said first algebraic summer for generating said clutch engagement signal for supply to said clutch actuator for engaging the friction clutch in a manner causing said transmission input speed signal to asymptotically approach said reference speed signal.

2. The automatic clutch controller as claimed in claim 1, wherein:
    said controller wherein
        said compensator has a transfer function having a notch filter with a frequency band in the range of the expected frequency of the oscillatory response to torque inputs of the at least one inertially-loaded traction wheel, said compensator thereby reducing the oscillatory response to torque inputs of the at least one inertially-loaded traction wheel.

3. The automatic clutch controller as claimed in claim 1, wherein
    said controller wherein
        said compensator has a transfer function having a region of increased gain in the frequency range where the expected response to torque inputs of the at least one inertially-loaded traction wheel is a minimum, said compensator thereby increasing loop gain and maintaining reduced sensitivity of said controller to variations in the response to torque inputs of the at least one inertially-loaded traction wheel.

4. The automatic clutch controller as claimed in claim 1, wherein:
    said controller wherein
        said prefilter is a low pass filter having a cutoff frequency selected to provide a desired transient response of the transmission input speed signal to a step function in said reference speed signal.

5. The automatic clutch controller as claimed in claim 1, wherein
    said controller further includes
        a second algebraic summer connected to said reference speed generator and said transmission input speed sensor for forming a second algebraic sum signal corresponding to the difference between (1) said reference speed signal and (2) said transmission input speed signal,
        a first integrator connected to said second algebraic summer for forming a first integral signal corresponding to the time integral of said second algebraic sum signal, and
        a third algebraic summer connected to said reference speed generator and said first integrator for forming a third algebraic sum signal corresponding to the sum of (1) said reference speed signal and (2) said first integral signal, said third algebraic sum signal supplied to said prefilter whereby said prefilter is connected to said reference speed generator via said third algebraic summer.

6. The automatic clutch controller as claimed in claim 5, wherein:
    said controller further includes
        a second integrator connected to said first integrator for forming a second integral signal corresponding to the time integral of said first integral signal, and
        said third algebraic summer is further connected to said second integrator for forming said third algebraic sum signal corresponding to the sum of (1) said reference speed signal, (2) said first integral signal and (3) said second integral signal.

7. The automatic clutch controller as claimed in claim 1, wherein:
said controller further includes
a differentiator connected to said engine speed sensor for generating a differential signal corresponding to the rate of change of said engine speed signal, and
a fourth algebraic summer connected to said compensator and said differentiator for generating said clutch actuation signal corresponding to the sum of (1) the output of said compensator and (2) said differential signal.

8. The automatic clutch controller as claimed in claim 7, wherein:
said controller further includes
a low pass filter disposed between said engine speed sensor and said differentiator.

9. The automatic clutch controller as claimed in claim 7, wherein:
said controller further includes
a third integrator connected to said differentiator for forming a third integral signal corresponding to the time integral of said differential signal, and
said fourth algebraic summer is further connected to said third integrator and generates said clutch actuation signal corresponding to the sum of (1) the output of said compensator, (2) said differential signal and (3) said third integral signal.

10. The automatic clutch controller as claimed in claim 9, wherein:
said controller further includes
a second algebraic summer connected to said reference speed generator and said transmission input speed sensor for forming a second algebraic sum signal corresponding to the difference between (1) said reference speed signal and (2) said transmission input speed signal,
a threshold detector connected to said differentiator for determining whether said differential signal is less than a predetermined threshold,
a first switch connected to said second algebraic summer and said threshold detector for generating a first switch output (1) equal to zero when said threshold detector determines said differential signal is less than said predetermined threshold, and (2) otherwise corresponding to said second algebraic sum signal,
a first integrator connected to said first switch for forming a first integral signal corresponding to the time integral of said first switch output, and
a third algebraic summer connected to said reference speed generator and said first integrator for forming a third algebraic sum signal corresponding to the sum of (1) said reference speed signal and (2) said first integral signal, said third algebraic sum signal supplied to said prefilter whereby said prefilter is connected to said reference speed generator via said third algebraic summer.

11. The automatic clutch controller as claimed in claim 10, wherein:
said controller wherein
said predetermined threshold of said threshold detector is zero.

12. The automatic clutch controller as claimed in claim 10, wherein:
said controller further includes
a second switch connected to said threshold detector and said first integrator for generating a second switch output (1) equal to zero when said threshold detector determines said differential signal is less than said predetermined threshold, and (2) otherwise corresponding to said first integral signal,
a second integrator connected to said second switch for forming a second integral signal corresponding to the time integral of said second switch output, and
said third algebraic summer is further connected to said second integrator for forming said third algebraic sum signal corresponding to the sum of (1) said reference speed signal, (2) said first integral signal and (3) said second integral signal.

13. The automatic clutch controller as claimed in claim 1, wherein:
said reference speed generator is connected to said engine speed sensor and generates said reference speed signal corresponding to said engine speed signal; and
said controller wherein
said compensator generates said clutch engagement signal for fully engaging the friction clutch within a predetermined interval of time after initial partial engagement.

14. The automatic clutch controller as claimed in claim 1, wherein:
said controller wherein
said compensator generates said clutch engagement signal indicative of desired clutch position; and
said clutch actuator controls the position of the friction clutch corresponding to the desired clutch position indicated by said clutch engagement signal.

15. The automatic clutch controller as claimed in claim 1, wherein:
said controller wherein
said compensator generates said clutch engagement signal indicative of desired clutch pressure; and
said clutch actuator controls the pressure of the friction clutch corresponding to the desired clutch pressure indicated by said clutch engagement signal.

16. The automatic clutch controller as claimed in claim 1, wherein the combination further includes a throttle for control of torque generated by the source of motive power, said automatic clutch controller further comprising:
a throttle sensor connected to the throttle for generating a throttle signal indicative of throttle position; and
said reference speed generator being connected to said engine speed sensor and said throttle sensor for generating said reference speed signal corresponding to said engine speed signal and said throttle signal.

17. The automatic clutch controller as claimed in claim 16, wherein:
said reference speed generator generates said reference speed signal as follows $$S_{ref} = E_{sp} \frac{T}{T_{ref}}$$

where: $S_{ref}$ is the reference speed signal; $E_{sp}$ is said engine speed signal; T is said throttle signal; and $T_{ref}$ is a throttle reference constant equal to the throttle signal for a predetermined throttle position.

18. The automatic clutch controller as claimed in claim 1, the combination further including a throttle for control of torque generated by the source of motive power, said automatic clutch controller further comprising:
- a throttle sensor connected to the throttle for generating a throttle signal indicative of throttle position; and
- said reference speed generator being further connected to said throttle and including
  - a launch/creep selector connected to said throttle sensor for selecting either a launch mode or a creep mode based upon the magnitude of said throttle signal,
  - a creep speed reference generator connected to said engine speed sensor and said throttle sensor for generating a creep speed reference signal corresponding to said engine speed signal and said throttle signal, and
  - a mode selection switch connected to said engine speed sensor, said launch/creep selector and said creep speed reference generator for selectively generating a reference speed signal corresponding to (1) said engine speed signal if said launch mode is selected and (2) said creep speed reference signal if said creep mode is selected.

19. The automatic clutch controller as claimed in claim 18, wherein:
said reference speed generator wherein
said launch/creep selection selects
said launch mode if said throttle signal indicates a throttle position of greater than a predetermined throttle position and otherwise selects said creep mode.

20. The automatic clutch controller as claimed in claim 19, wherein:
said reference speed generator wherein
said predetermined throttle position of said launch/creep selector is 25% of full throttle.

21. The automatic clutch controller as claimed in claim 18, wherein:
said reference speed generator wherein
said creep speed reference generator generates said creep speed reference signal as follows $$S_{ref} = E_{sp} \frac{T}{T_{ref}}$$

where: $S_{ref}$ is the creep speed reference signal; $E_{sp}$ is said engine speed signal; T is said throttle signal; and $T_{ref}$ is a throttle reference constant equal to the throttle signal for said predetermined throttle position.

22. The automatic clutch controller as claimed in claim 21, wherein:
said controller wherein
said compensator generates said clutch engagement signal for fully engaging the friction clutch within a predetermined interval of time after initial partial engagement when said launch mode is selected.

23. The automatic clutch controller as claimed in claim 21, wherein:
said controller wherein
said compensator generates said clutch engagement signal indicative of desired clutch pressure; and
said clutch actuator controls the pressure of the friction clutch corresponding to the desired clutch pressure indicated by said clutch engagement signal.

24. In a combination including a source of motive power, a throttle for control of torque generated by the source of motive power, a friction clutch having an input shaft connected to the source of motive power and an output shaft, and at least one inertially-loaded traction wheel connected to the output shaft of the friction clutch having a torsional compliance exhibiting an oscillatory response to torque inputs, an automatic clutch controller comprising:
- a throttle sensor connected to the throttle for generating a throttle signal indicative of throttle position;
- an engine speed sensor connected to the source of motive power for generating an engine speed signal corresponding to the rotational speed of the source of motive power;
- a transmission input speed sensor connected to an output shaft of the friction clutch for generating a transmission input speed signal corresponding to the rotational speed of the output shaft of the friction clutch;
- a clutch actuator connected to the friction clutch for controlling engagement of the friction clutch from disengaged to fully engaged according to a clutch engagement signal; and
- a reference speed generator connected to said throttle sensor and said engine speed sensor including
  - a launch/creep selector connected to said throttle sensor for selecting either a launch mode or a creep mode based upon the magnitude of said throttle signal,
  - a creep speed reference generator connected to said engine speed sensor and said throttle sensor for generating a creep speed reference signal corresponding to said engine speed signal and said throttle signal, and
  - a mode selection switch connected to said engine speed sensor, said launch/creep selector and said creep speed reference generator for generating a speed reference signal corresponding to (1) said engine speed if said launch mode is selected and (2) said creep speed reference signal if said creep mode is selected; and
- a controller connected to said reference speed generator, said transmission input speed sensor and said clutch actuator including
  - a prefilter connected to said reference speed generator for generating a filtered reference speed signal,
  - a first algebraic summer connected to said transmission input speed sensor and said prefilter generating a first algebraic sum signal corresponding to the difference between (1) said filtered speed reference signal and (2) said transmission input speed signal, and
  - a compensator connected to said first algebraic summer for generating said clutch engagement signal for supply to said clutch actuator for engaging the friction clutch in a manner causing said transmission input speed signal to asymptotically approach said reference speed signal.

25. The automatic clutch controller as claimed in claim 24, wherein:
said controller wherein
said compensator has a transfer function having a notch filter with a frequency band in the range of the expected frequency of the oscillatory response to torque inputs of the at least one inertially-loaded traction wheel, said compensator thereby reducing the oscillatory response to torque inputs of the at least one inertially-loaded traction wheel.

26. The automatic clutch controller as claimed in claim 24, wherein:
said controller wherein
said compensator has a transfer function having a region of increased gain in the frequency range where the expected response to torque inputs of the at least one inertially-loaded traction wheel is a minimum, said compensator thereby increasing loop gain and maintaining reduced sensitivity of said controller to variations in the response to torque inputs of the at least one inertially-loaded traction wheel.

27. The automatic clutch controller as claimed in claim 24, wherein:
said controller wherein
said prefilter is a low pass filter having a cutoff frequency selected to provide a desired transient response of input speed response to a step function in said speed reference signal.

28. The automatic clutch controller as claimed in claim 24, wherein
said controller further includes
a second algebraic summer connected to said reference speed generator and said transmission input speed sensor for forming a second algebraic sum signal corresponding to the difference between (1) said reference speed signal and (2) said transmission input speed signal,
a first integrator connected to said second algebraic summer for forming a first integral signal corresponding to the time integral of said second algebraic sum signal, and
a third algebraic summer connected to said reference speed generator and said first integrator for forming a third algebraic sum signal corresponding to the sum of (1) said reference speed signal and (2) said first integral signal, said third algebraic sum signal supplied to said prefilter whereby said prefilter is connected to said reference speed generator via said third algebraic summer.

29. The automatic clutch controller as claimed in claim 28, wherein:
said controller further includes
a second integrator connected to said first integrator for forming a second integral signal corresponding to the time integral of said first integral signal, and
said third algebraic summer is further connected to said second integrator for forming said third algebraic sum signal corresponding to the sum of (1) said reference speed signal, (2) said first integral signal and (3) said second integral signal.

30. The automatic clutch controller as claimed in claim 24, wherein:
said controller further includes
a differentiator connected to said engine speed sensor for generating a differential signal corresponding to the rate of change of said engine speed signal, and
a fourth algebraic summer connected to said compensator and said differentiator for generating said clutch engagement signal corresponding to the sum of (1) the output of said compensator and (2) said differential signal.

31. The automatic clutch controller as claimed in claim 30, wherein:
said controller further includes
a low pass filter disposed between said engine speed sensor and said differentiator.

32. The automatic clutch controller as claimed in claim 30, wherein:
said controller further includes
a third integrator connected to said differentiator for forming a third integral signal corresponding to the time integral of said differential signal, and
said fourth algebraic summer is further connected to said third integrator and generates said clutch actuation signal corresponding to the sum of (1) the output of said compensator, (2) said differential signal and (3) said third integral signal.

33. The automatic clutch controller as claimed in claim 30, wherein:
said controller further includes
a second algebraic summer connected to said reference speed generator and said transmission input speed sensor for forming a second algebraic sum signal corresponding to the difference between (1) said reference speed signal and (2) said transmission input speed signal,
a threshold detector connected to said differentiator for determining whether said differential signal is less than a predetermined threshold,
a first switch connected to said second algebraic summer and said threshold detector for generating a first switch output (1) equal to zero when said threshold detector determines said differential signal is less than said predetermined threshold, and (2) otherwise corresponding to said second algebraic sum signal,
a first integrator connected to said first switch for forming a first integral signal corresponding to the time integral of said first switch output, and
a third algebraic summer connected to said reference speed generator and said first integrator for forming a third algebraic sum signal corresponding to the sum of (1) said reference speed signal and (2) said first integral signal, said third algebraic sum signal supplied to said prefilter whereby said prefilter is connected to said reference speed generator via said third algebraic summer.

34. The automatic clutch controller as claimed in claim 33, wherein:
said controller wherein
said predetermined threshold of said threshold detector is zero.

35. The automatic clutch controller as claimed in claim 33, wherein:
said controller further includes a second switch connected to said threshold detector and said first integrator for generating a second switch output (1) equal to zero when said threshold detector determines said differential signal is less than said predetermined threshold, and (2) otherwise corresponding to said first integral signal, a second integrator connected to said second switch for forming a second integral signal corresponding to the time integral of said second switch output, and said third algebraic summer is further connected to said second integrator for forming said third algebraic sum signal corresponding to the sum of (1) said reference speed signal, (2) said first integral signal and (3) said second integral signal.

36. The automatic clutch controller as claimed in claim 24, wherein:

said controller wherein
said compensator generates said clutch
engagement signal indicative of desired clutch position; and
said clutch actuator controls the position of the friction clutch corresponding to the desired clutch position indicated by said clutch engagement signal.

37. The automatic clutch controller as claimed in claim 24, wherein:

said reference speed generator wherein
said launch/creep selector selects said launch mode if said throttle signal indicates a throttle position of greater than a predetermined throttle position and otherwise selects said creep mode.

38. The automatic clutch controller as claimed in claim 37, wherein:

said reference speed generator wherein
said predetermined throttle position of said launch/creep selector is 25% of full throttle.

39. The automatic clutch controller as claimed in claim 24, wherein:

said reference speed generator wherein
said creep speed reference generator generates said creep speed reference signal as follows $$R_{crp} = E_{sp} \frac{T}{T_{ref}}$$

where: $R_{crp}$ is the creep speed reference signal; $E_{sp}$ is said engine speed signal; $T$ is said throttle signal; and $T_{ref}$ is a throttle reference constant equal to the throttle signal for said predetermined throttle position.

40. In a combination including a source of motive power, a friction clutch having an input shaft connected to the source of motive power and an output shaft, a transmission having an input shaft connected to the output shaft of the friction clutch and providing a selectable gear ratio to an output shaft, and at least one inertially-loaded traction wheel connected to the output shaft of the transmission having a torsional compliance exhibiting an oscillatory response to torque inputs, an automatic clutch controller comprising:

a transmission shift controller connected to the transmission for controlling the gear ratio selected by the transmission;

an engine speed sensor connected to the source of motive power for generating an engine speed signal corresponding to the rotational speed of the source of motive power;

a reference speed generator connected to said engine speed sensor for generating a reference speed signal;

a transmission input speed sensor connected to the input shaft of the transmission for generating a transmission input speed signal corresponding to the rotational speed of the output shaft of the friction clutch;

a clutch actuator connected to the friction clutch for controlling engagement of the friction clutch from disengaged to fully engaged according to a clutch engagement signal; and a controller connected to said transmission shift controller, said reference speed generator, said transmission input speed sensor, and said clutch actuator, said controller implemented via discrete difference equations executed by a microcontroller and including a coefficient memory for storing a plurality of sets of coefficients, one set of coefficients corresponding to each selectable gear ratio of the transmission, a first algebraic summer for forming a first algebraic sum signal corresponding to the difference between said reference speed signal and said transmission input speed signal, a prefilter connected to said coefficient memory and said reference speed generator for generating a filtered reference speed signal, said prefilter implemented in discrete difference equations employing a set of coefficients recalled from said coefficient memory corresponding to the gear ratio of the transmission, a second algebraic summer connected to said transmission input speed sensor and said prefilter generating a second algebraic sum signal corresponding to the difference between said filtered reference speed signal and said transmission input speed signal, and a compensator connected to said coefficient memory and said second algebraic summer for generating a clutch engagement signal for supply to said clutch actuator for engaging the friction clutch in a manner causing said transmission input speed signal to asymptotically approach said reference speed signal, said compensator implemented in discrete difference equations employing a set of coefficients recalled from said coefficient memory corresponding to the gear ratio of the transmission.

41. The automatic clutch controller as claimed in claim 40, wherein:

said controller wherein
said compensator has a transfer function having a notch filter with a frequency band in the range of the expected frequency of the oscillatory response to torque inputs of the at least one inertially-loaded traction wheel, said compensator thereby reducing the oscillatory response to torque inputs of the at least one inertially-loaded traction wheel.

42. The automatic clutch controller as claimed in claim 40, wherein:

said controller wherein
said compensator has a transfer function having a region of increased gain in the frequency range where the expected response to torque inputs of the at least one inertially-loaded traction wheel is a minimum, said compensator thereby increasing loop gain and maintaining reduced sensitivity of said controller to variations in the response to torque inputs of the at least one inertially-loaded traction wheel.

43. The automatic clutch controller as claimed in claim 40, wherein:

said reference speed generator is connected to said engine speed sensor and generates said reference speed signal proportional to said engine speed signal; and said controller wherein said compensator includes an integral function for generating said clutch engagement signal for fully engaging the friction clutch within a predetermined interval of time after initial partial engagement.

* * * * *